US009349130B2

(12) United States Patent
Ball et al.

(10) Patent No.: US 9,349,130 B2
(45) Date of Patent: May 24, 2016

(54) GENERATING RELATIVE AND ABSOLUTE POSITIONED RESOURCES USING A SINGLE EDITOR HAVING A SINGLE SYNTAX (75) Inventors: Michael Ball, Fairfax, VA (US); Evin Grano, Mitchells, VA (US)

(73) Assignee: ELOQUA, INC., Vienna, VA (US)

( * ) Notice: Subject to any disclaimer, the term of this patent is extended or adjusted under 35 U.S.C. 154(b) by 878 days.

(21) Appl. No.: 13/298,977

(22) Filed: Nov. 17, 2011

(65) Prior Publication Data
US 2012/0185764 A1 Jul. 19, 2012

Related U.S. Application Data (60) Provisional application No. 61/414,619, filed on Nov. 17, 2010.

(51) Int. Cl.
G06F 17/00 (2006.01)
G06Q 30/02 (2012.01)
G06F 17/21 (2006.01)

(52) U.S. Cl.
CPC .............. *G06Q 30/02* (2013.01); *G06F 17/212* (2013.01)

(58) Field of Classification Search
CPC ............................... G06F 17/00; G06F 17/212
USPC ........................................ 715/243, 234, 235
See application file for complete search history.

(56) References Cited

U.S. PATENT DOCUMENTS

| | | | |
|---|---|---|---|
| 5,838,317 A | 11/1998 | Bolnick et al. | |
| 6,374,272 B2 | 4/2002 | Bates et al. | |
| 7,149,967 B2 * | 12/2006 | Pollock et al. | 715/243 |
| 7,461,332 B2 | 12/2008 | Brintzenhofe et al. | |
| 7,587,413 B2 | 9/2009 | Nagral et al. | |
| 7,962,522 B2 | 6/2011 | Norris, III | |
| 8,165,404 B2 * | 4/2012 | Matulic | G06K 9/00442 382/186 |
| 8,271,871 B2 * | 9/2012 | Marchesotti | 715/243 |
| 8,291,314 B2 * | 10/2012 | Atkins | G09G 5/14 715/234 |
| 8,341,517 B2 * | 12/2012 | Terayoko | G09G 5/14 345/619 |
| 8,386,924 B2 * | 2/2013 | Fitzsimons et al. | 715/249 |
| 8,451,478 B2 * | 5/2013 | Tsunekawa | G06F 3/1237 358/1.15 |
| 8,533,590 B2 * | 9/2013 | Ishiguro | G06F 17/211 715/204 |
| 8,578,273 B2 * | 11/2013 | MacKenzie | G06F 3/04845 715/730 |
| 8,629,873 B2 * | 1/2014 | Kageyama | G01N 30/8651 345/440 |
| 8,645,821 B2 * | 2/2014 | Dejean | G06K 9/00463 715/246 |
| 8,650,503 B2 * | 2/2014 | Mihalcea | G06F 8/38 715/711 |
| 8,704,850 B2 * | 4/2014 | Raffman | G06F 3/048 345/619 |
| 8,781,742 B2 * | 7/2014 | Albrecht | G01C 21/367 340/995.14 |

(Continued)

OTHER PUBLICATIONS

International Search Report and Written Opinion for PCT/US2011/061226, mailed May 23, 2012.

*Primary Examiner* — Mohammed-Ibrahim Zuberi
(74) *Attorney, Agent, or Firm* — Vista IP Law Group, LLP (57) ABSTRACT Both a relative positioned resource and an absolute positioned resource may be generated using a single editor having a single syntax for both the relative and absolute positioned elements. A layout module generates an intermediate data structure based on element information. The element information includes content of at least one element, Cartesian coordinates of the at least one element, and dimensional information of the at least one element. A unified processing module generates a first resource having absolute positioned elements by processing the intermediate data structure, and generates a second resource having relative positioned elements by processing the same intermediate data structure.

24 Claims, 7 Drawing Sheets

(56) References Cited

U.S. PATENT DOCUMENTS

| | | | |
|---|---|---|---|
| 8,849,043 B2 * | 9/2014 | Ptucha | G06K 9/6202 345/581 |
| 8,849,853 B2 * | 9/2014 | Ptucha | G06T 11/60 707/749 |
| 8,854,395 B2 * | 10/2014 | Ptucha | G06F 17/30256 345/581 |
| 9,152,292 B2 * | 10/2015 | Xiao | G06F 3/0481 |
| 9,183,185 B2 * | 11/2015 | Chao | G06T 11/60 |
| 2004/0145593 A1 | 7/2004 | Berkner et al. | |
| 2005/0086587 A1 | 4/2005 | Balz | |
| 2006/0039610 A1 | 2/2006 | Cantral | |
| 2006/0174199 A1 | 8/2006 | Soltis et al. | |
| 2007/0038643 A1 | 2/2007 | Epstein | |
| 2007/0180019 A1 | 8/2007 | Woods | |
| 2007/0208996 A1 | 9/2007 | Berkner et al. | |
| 2009/0089660 A1 * | 4/2009 | Atkins et al. | 715/243 |
| 2010/0070542 A1 | 3/2010 | Feinsmith | |
| 2010/0100815 A1 | 4/2010 | Hutchinson et al. | |
| 2010/0174976 A1 | 7/2010 | Mansfield et al. | |
| 2011/0016419 A1 | 1/2011 | Grosz et al. | |
| 2011/0035692 A1 | 2/2011 | Sandone et al. | |
| 2011/0167336 A1 | 7/2011 | Aitken et al. | |

* cited by examiner

| Coords | Content | Width | Height |
|--------|---------|-------|--------|
| 0,0 | Image 1 | 3 | 2 |
| 1,4 | Text | 3 | 2 |
| 5,4 | Dynamic Content | 3 | 2 |
| 0,8 | Image 2 | 3 | 2 |

1. Loop over all the elements to be converted, and in each pass push the elements min and max coordinates in the X and Y coordinate spaces on separate arrays colList and rowList respectively.
2. Remove all duplicate elements from colList and rowList.
3. Sort the colList and rowList.
4. Convert the colList and rowList into sets of ranges where each range is starting coordinate and a length.
5. Create a matrix where rows = rowRanges.length and cols = colRanges.length. Optionally initialize the matrix with a constant that indicates an empty element.
6. Loop over all the elements again and with each iteration:
    a. Create an xRange and yRange in the manner described above
    b Determine which rowRanges and colRanges the xRange and yRange intersect with
    c. Using the array index insert the content of the element into the matrix
    d. If there are any additional intersections add Skip elements to the matrix and add an indication of rowSpans and colSpans to the inserted element;
7. Using the matrix from above create a table structure.
    a. For Each row insert open and close <tr>
    b. for each element:
        i. if empty -> insert a td tag where the width and height properties correspond to the size of the colRange and rowRange
        ii. if element -> insert a td tag where the colSpan and rowSpan are set accordingly and the content for the element is inserted in the td

Pseudo Code For Relative Positioning Processor

FIG. 5A rowList {0, 2, 4, 6, 4, 6, 8, 10} colList {0, 3, 1 4, 5, 8, 0, 3}

(Step 1)

FIG. 5B rowList {0, 2, 4, 6, 8, 10} colList {0, 3, 1, 4, 5, 8}

(Step 2)

FIG. 5C rowList {0, 2, 4, 6, 8, 10} colList{0, 1, 3, 4, 5, 8}

(Step 3)

FIG. 5D rowRanges {0,0; 10} colRanges {0,0; 8}

(Step 4)

FIG. 6

| Image 1 | Image 1 | Image 1 | | | | |
|---|---|---|---|---|---|---|
| Image 1 | Image 1 | Image 1 | | | | |
| | | | | | | |
| | | | | | | |
| | Text | Text | Text | | Dynamic Content | Dynamic Content | Dynamic Content |
| | Text | Text | Text | | Dynamic Content | Dynamic Content | Dynamic Content |
| | | | | | | |
| | | | | | | |
| Image 2 | Image 2 | Image 2 | | | | |
| Image 2 | Image 2 | Image 2 | | | | |

(Steps 5 & 6)

FIG. 7

(Step 7)

GENERATING RELATIVE AND ABSOLUTE POSITIONED RESOURCES USING A SINGLE EDITOR HAVING A SINGLE SYNTAX

CROSS-REFERENCE TO RELATED APPLICATION

This application claims priority to and the benefit of, and incorporates herein by reference in its entirety, U.S. Provisional Patent Application No. 61/414,619, which was filed on Nov. 17, 2010.

TECHNICAL FIELD

In various embodiments, the present invention relates to content development and management and, more particularly, to systems and methods for providing content layout management according to various paradigms.

BACKGROUND

In bringing a product or products to market, a marketing department in an organization will typically produce several different marketing campaigns. Often, each such campaign will involve a separate marketing effort, such as web site promotion, electronic mail ("e-mail") promotion, print mail promotion (i.e., a promotional mailing physically sent using a postal service, rather than electronically sent over a computer network), a web-based event, and/or a live event. Each such effort is typically conceptualized as a different marketing channel, defined by the particular medium used to connect consumers to marketed goods and/or services.

When designing a marketing channel, a developer typically designs and develops content that is provided on the channel to consumers. Each marketing channel (e.g., e-mail, web site, print mail, etc.) may be constrained by different technical limitations, or not constrained at all. Such technical constraints may be different in the case of e-mail and web sites. For example, e-mail and web sites typically utilize two different positioning techniques for content elements. E-mail typically utilizes relative positioning of content elements, while web sites typically utilize both relative and absolute positioning of content elements.

Absolute positioned elements are typically positioned relative to the next positioned element (generally referred to as the "parent"). If there is no parent, then a containment block (e.g., the "view port", also called the initial containment block) is used. The positioning values are generally offsets relative to the upper-left corner of the parent element or containment block. A resource (e.g., a web site) that utilizes absolute positioning is usually considered to provide a richer presentation of content.

Relative positioned elements are typically positioned relative to the natural flow (e.g., HTML flow) of the document, and the position of an element is offset based on a preceding element.

Because of the different technical constraints involved when designing absolute and relative positioned resources, marketers have typically used two sets of development tools or suites to create, for example, the e-mail and web page. In the case of those tools that do let a marketer design both absolute and relative positioned resources, the syntax and know-how for successfully designing and implementing these resources are different.

If a marketer designs a single channel, then the extra tools do not pose a significant inconvenience or redundancy. However, e-mail channels and web sites often work in tandem to bring together a consumer and a product. For example, an e-mail may be used to initiate the channel with the consumer and then, upon clicking on an advertisement, the consumer is brought to a landing page displaying additional content elements that are an extension of the content elements found in the e-mail. The content elements in the e-mail and the landing page typically complement each other. Nevertheless, developers generally either (1) create these channels with two different development tools because e-mail will not support the absolute positioning layout that provides the richer content found in a web page, or (2) compromise on the less rich content supported in a relative positioning layout.

Thus, there is a need for a single tool that allows marketers to use a single syntax and set of know-how to organize and manage the layout of both absolute positioned content and relative positioned content.

SUMMARY OF THE INVENTION

In various embodiments, the problems of the prior art are overcome by providing a single tool that allows marketers to organize and manage the layout of content according to a single unified model. The model is easily exported into channels utilizing either the absolute or the relative positioning paradigm. In one embodiment, the tool is operable on a computer, and, more specifically, in a web browser executing on the computer.

In general, in one aspect, embodiments of the invention feature a method for creating resources having absolute and relative positioned elements using a single unified model. More specifically, an intermediate data structure is generated based on element information and is stored in computer memory. The element information includes content of at least one element, Cartesian coordinates of the at least one element, and dimensional information of the at least one element. A first resource having absolute positioned elements is generated by processing, through use of a computer processor, the intermediate data structure. Moreover, a second resource having relative positioned elements is generated by processing, through use of the computer processor, the same intermediate data structure. Optionally, the method may be performed within a web browser.

In general, in another aspect, embodiments of the invention feature a computing system for creating resources having absolute and relative positioned elements. The computing system includes a computer memory, a layout module, and a unified processing module. The layout module generates, and stores in the computer memory, an intermediate data structure based on element information. As before, the element information includes content of at least one element, Cartesian coordinates of the at least one element, and dimensional information of the at least one element. For its part, the unified processing module generates a first resource having absolute positioned elements by processing the intermediate data structure, and generates a second resource having relative positioned elements by processing the same intermediate data structure. In order to do so, the unified processing module may include an absolute positioning processor and a relative positioning processor. Optionally, either the layout module, the unified processing module, or both may operate within a web browser.

In various embodiments of these aspects of the invention, the intermediate data structure is an array having fields for the content of the at least one element, a starting coordinate of the at least one element, a width of the at least one element, and a height of the at least one element. The content may include text, an image, audio, a video, a form, a field merge, and/or dynamic content. The first resource and the second resource may be in different formats, renderable by a browser's layout engine. In one embodiment, the first resource is a web page. The second resource may be an e-mail.

The layout module may present a canvas to a user. In one embodiment, the canvas allows the user to layout elements for the various resources described above. From the position of the elements on the canvas, various position information may be generated and may be used to generate the intermediate data structure noted above. In one embodiment, the canvas is part of a "what-you-see-is-what-you-get" layout editor.

In various embodiments, the unified processing module creates a table structure based on the element information in generating the second resource. The unified processing module may also cause at least one of the first resource or the second resource to be displayed on a computer display.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION

The following description provides exemplary embodiments of methods and systems consistent with the present invention, which should not be interpreted to limit the scope one of ordinary skill in the art would give to the invention.

Figure 1:
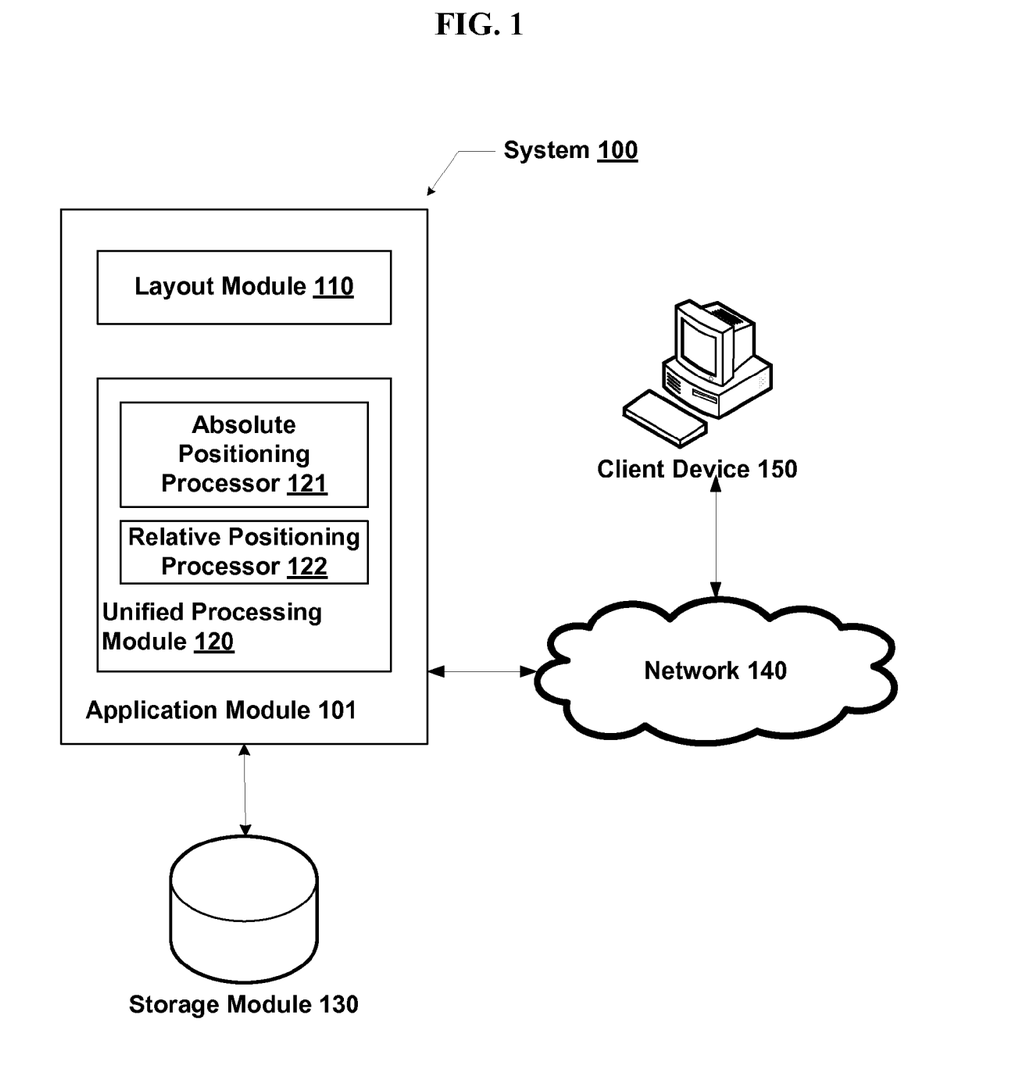
FIG. 1 is a block diagram of a computing system for developing and managing content according to an exemplary embodiment of the invention.

FIG. 1 illustrates a system 100 according to an exemplary embodiment of the present invention. The system 100 includes an application module 101, a storage module 130, a network 140, and a client device 150. As illustrated, the application module 101 may include a layout module 110 and a unified processing module 120. The unified processing module 120 may itself include an absolute positioning processor 121 and a relative positioning processor 122. As illustrated, the application module 101 may be a web server application, which executes on a web server and over the network 140. The web server may include a processor, and may also include or interface with computer memory (e.g., the storage module 130). Alternatively, the application module 101 may execute on a machine local to a user of the system 100 (e.g., on the client device 150). For example, the application module 101 may be a software application executing within a web browser (e.g., a JAVA® Applet) at the client device 150.

As used herein, references to "machine(s)" and/or "device(s)," such as the client device 150, may include, without limitation, a general purpose computer that includes a processing unit, a system memory, and a system bus that couples various system components including the system memory and the processing unit. The general purpose computer may employ the processing unit to execute computer-executable program modules stored on one or more computer readable media forming the system memory. The program modules may include routines, programs, objects, components, data structures, etc. that perform particular tasks or implement particular abstract data types.

Moreover, as used herein, references to "a module," "modules", "function", and/or "algorithm"—e.g., the application module 101, storage module 130, layout module 110, and unified processing module 120—generally mean, but are not limited to, a software or hardware component that performs certain tasks. A module may advantageously be configured to reside on an addressable storage medium and be configured to execute on one or more processors. A module may be fully or partially implemented with a general purpose integrated circuit (IC), co-processor, field-programmable gate array (FPGA), or application-specific integrated circuit (ASIC). Thus, a module may include, by way of example, components, such as software components, object-oriented software components, class libraries, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or be further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges (PBX). In any of these cases, implementation may be achieved either by writing applications that are native to the chosen platform, or by interfacing the platform to one or more external application engines.

In one exemplary embodiment, a user may interface with the Client Device 150 via a user interface. The user may enter commands and information through the user interface, such as through input devices such as a keyboard, a touch-screen, and/or a pointing device, commonly referred to as a mouse, trackball or touch pad. In one embodiment, the user interacts with the application module 101, the storage module 130, and/or their various component modules using these and other input devices in conjunction with a graphical user interface (GUI) provided on the client device 150, or hosted on a server (such as a server also hosting the application module 101), and accessed by a terminal or internet browser local to the client device 150.

In addition, various networks, such as network 140, may be employed in accordance with embodiments of the invention. Networks consistent with exemplary embodiments of the invention, including network 140, may be a wired or wireless local area network (LAN) or wide area network (WAN), a wireless personal area network (PAN), and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via a user-input interface, or other appropriate mechanism. Computers may be connected over the Internet, an Intranet, an Extranet, an Ethernet, or any other network that facilitates communications. In addition, any number of transport protocols may be utilized, including, without limitation, the User Datagram Protocol (UDP), Transmission Control Protocol (TCP), Venturi Transport Protocol (VTP), Datagram Congestion Control Protocol (DCCP), Fiber Channel Protocol (FCP), Stream Control Transmission Protocol (SCTP), Reliable User Datagram Protocol (RUDP), and Resource ReSerVation Protocol (RSVP). For wireless communications, communications protocols may include Bluetooth, Zigbee, IrDa, or other suitable protocol. Furthermore, components of the systems described herein may communicate through a combination of wired or wireless paths.

In one embodiment, a user interfaces with the application module 101 via a graphical user interface and the layout module 110, which optionally executes at the Client Device 150 or over the network 140 at a web server. The layout module 110 receives layout selections and commands from the user of the system 100, and stores the layout in an intermediate data structure for further processing by the unified processing module 120. The unified processing module 120 may then generate either or both the absolute and relative positioned resources.

Figure 2:
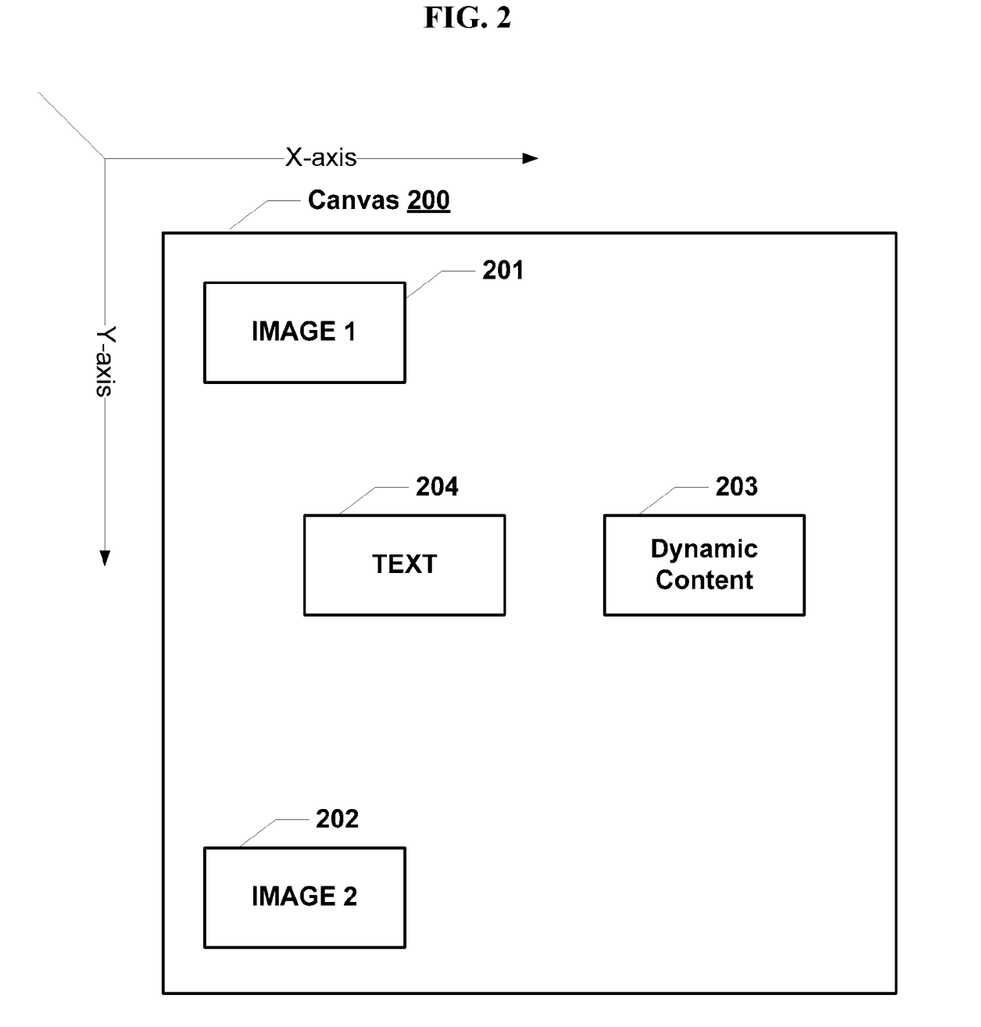
FIG. 2 illustrates a canvas for laying out content according to an exemplary embodiment of the invention.

In one exemplary embodiment, the layout module 110 presents a layout editor to the user. The layout editor may present the user with a canvas for arranging the layout of elements. FIG. 2 illustrates an exemplary canvas 200 presented to the user of the system 100. In this exemplary embodiment, the canvas 200 is a WYSIWYG ("what-you-see-is-what-you-get") editing interface. A user may drag-and-drop content elements, for example images 201 and 202, dynamic content 203, and text 204, onto the canvas 200. Those of ordinary skill in the art will appreciate that other forms of content may also be employed with the invention, including, without limitation, audio, video, forms, field merges, etc. The user may manage the size, location and relationships of the various content elements on the canvas 200.

In one embodiment, the layout module 110 generates an intermediate data structure and populates it with content and positional information either as the user places or manages content on the canvas 200. In one exemplary embodiment, the intermediate data structure is an array that includes the content of each element, the Cartesian coordinates of the top left corner of each element, and the height and the width of each element. The layout module 110 may also add other information to the intermediate data structure, as will be appreciated by one of ordinary skill in the art.

Figure 3:
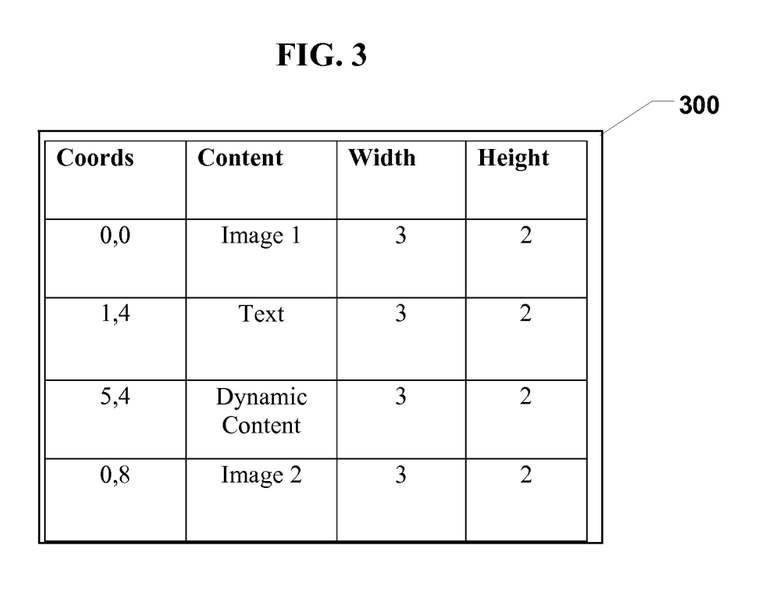
FIG. 3 illustrates a data structure having layout information according to an exemplary embodiment of the invention.

FIG. 3 illustrates an exemplary embodiment of an intermediate data structure 300. In particular, FIG. 3 illustrates the intermediate data structure 300 as it would appear if the canvas 200 of FIG. 2 were populated with the illustrated content elements 201, 202, 203, and 204. In this example, the intermediate data structure 300 is conceptualized as a 5×4 matrix. The information stored in the intermediate data structure 300 includes the coordinates of each element, the content (e.g., text, image, etc.) of the element, the element's width (e.g., in hundreds of pixels), and the element's height (e.g., in hundreds of pixels). As mentioned, in one exemplary embodiment the stored coordinates are the starting coordinates of the upper left corner of each element.

When the user finishes placing the content elements 201, 202, 203, and 204 on the canvas 200 and selects either exporting to a relative positioning resource (e.g., e-mail) or to an absolute positioning resource (e.g., web page), the system 100 passes the intermediate data structure 300 to the unified processing module 120. The unified processing module 120 then processes the intermediate data structure 300 to create the relative or absolute positioned resource (or both). In other embodiments, the user may select exporting options before laying out the elements 201, 202, 203, and 204. Those of ordinary skill in the art will recognize that the invention is capable of generating resources in different file formats, each of which is separately renderable by a web browser's layout engine.

Figure 4:
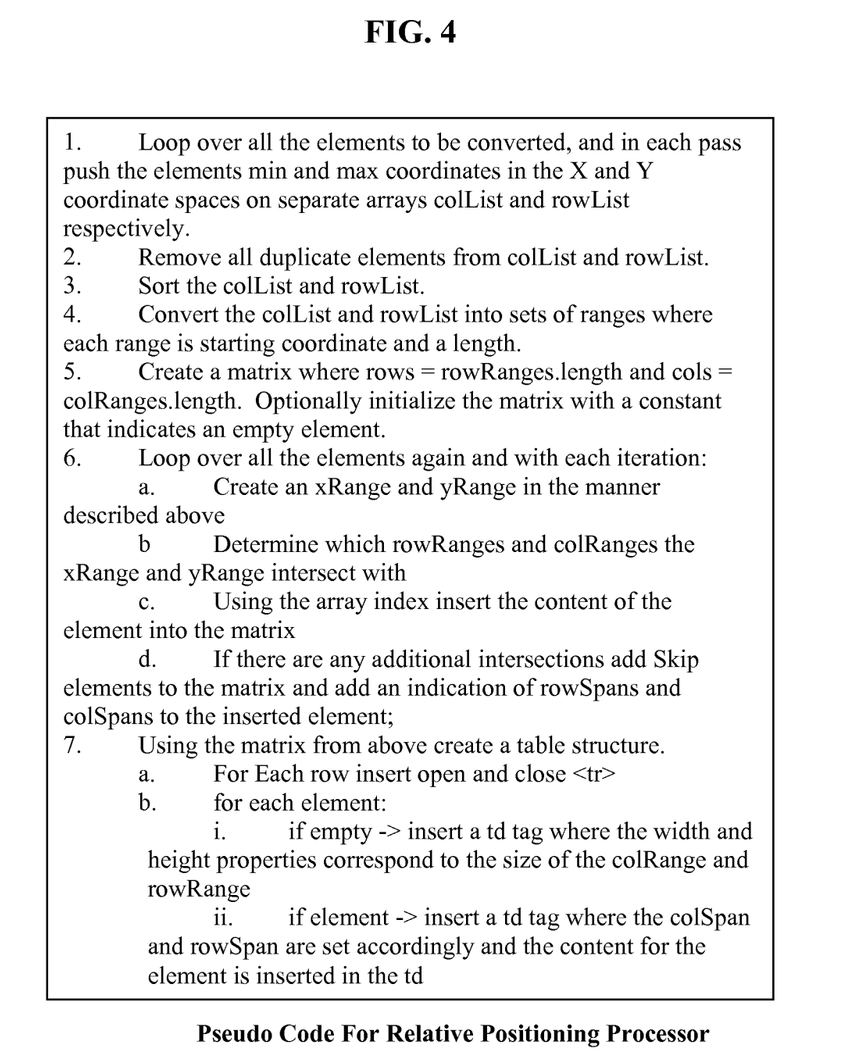
FIG. 4 is pseudo-code for an exemplary operation of the relative positioning processor depicted in the system of FIG. 1.

In one embodiment, as illustrated in FIG. 1, the unified processing module 120 includes two sub-processing modules, the absolute positioning processor 121 and the relative positioning processor 122. In one embodiment, the relative positioning processor 122 operates upon the intermediate data structure 300 according to the exemplary pseudo code illustrated in FIG. 4 to create a table structure and thereafter a relative positioned resource.

Application of that exemplary relative-positioning pseudo-code to the layout illustrated in FIG. 2, is set forth in FIGS. 5A to 7.

Figure 5A:
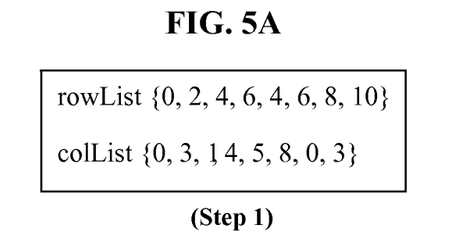
FIGS. 5A through 5D illustrate exemplary variable values in connection with an exemplary operation of the pseudo-code illustrated in FIG. 4 and the canvas illustrated in FIG. 2.

In Step 1 of the pseudo-code, the relative positioning processor 122, as illustrated in FIG. 5A, creates a colList and a rowList from the intermediate data structure 300 of FIG. 3. In this exemplary embodiment, the colList includes the minimum and maximum coordinates of each of the content elements 201, 202, 203, and 204 in the X coordinate space, and the rowList includes the minimum and maximum coordinates of each of the content elements 201, 202, 203, and 204 in the Y coordinate space.

Figure 5B:
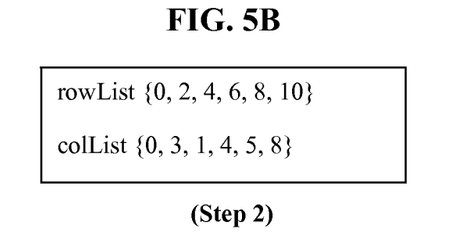

In step 2, the relative positioning processor 122, as illustrated in FIG. 5B, eliminates all duplicate values in the colList and in the rowList.

Figure 5C:
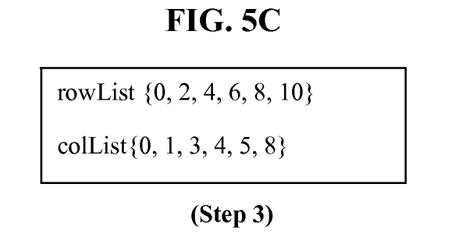

In step 3, the relative positioning processor 122, as illustrated in FIG. 5C, sorts the values in the colList and in the rowList.

Figure 5D:
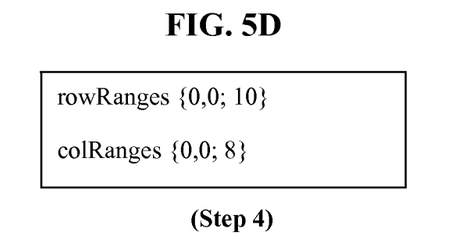

In step 4, the relative positioning processor 122, as illustrated in FIG. 5D, converts the colList and rowList values into sets of ranges, colRange and rowRange, where each range is a starting coordinate and a length. In step 5, the relative positioning processor 122 creates a matrix (such as the matrix 600 illustrated in FIG. 6) having dimensions (row, column) equal to the row length and the column length determined in step 4.

Figure 6:
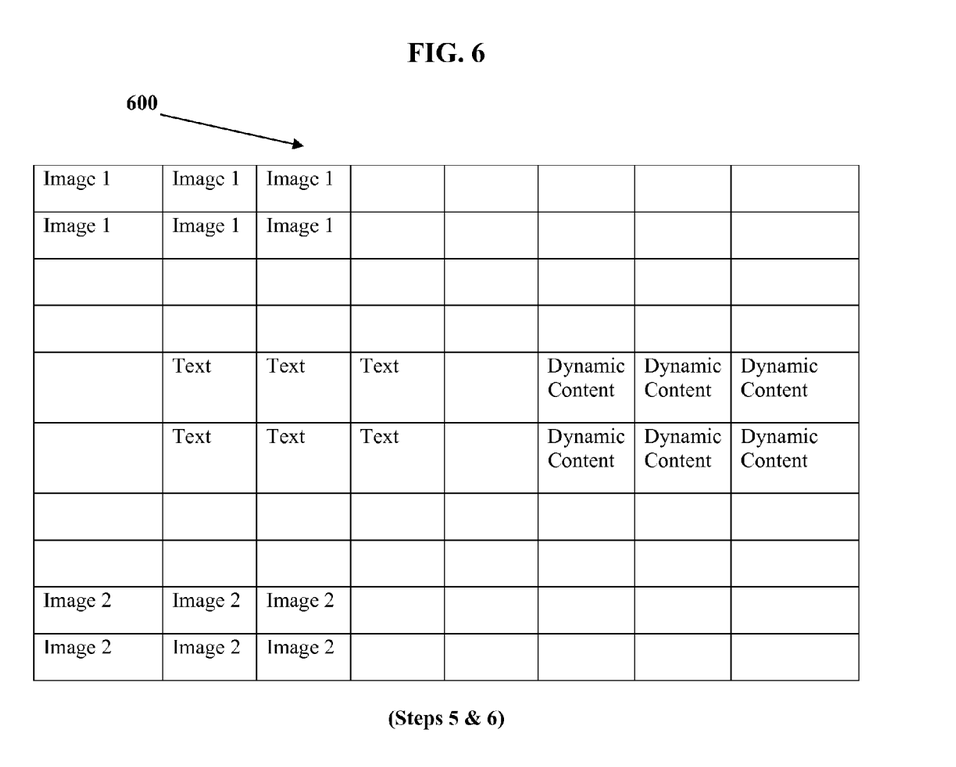
FIG. 6 illustrates an exemplary HTML table structure in connection with an exemplary operation of the pseudo-code illustrated in FIG. 4 and the canvas illustrated in FIG. 2.

In step 6, the relative positioning processor 122 inserts the content elements 201, 202, 203, and 204 into the matrix 600. To determine the position of each content element in the matrix 600, in step 6(a) the relative positioning processor 122 loops over each content element again and creates, for each content element, an xRange and yRange. In particular, for each content element 201, 202, 203, and 204, the relative positioning processor 122 individually repeats pseudo-code steps 1 through 4 described above. In step 6(b), the relative positioning processor 122 determines with which colRanges and rowRanges the xRange and yRange of each content element intersect. In one embodiment, the relative positioning processor 122 determines the intersection by iteratively comparing the coordinate and range data of each element 201, 202, 203, and 204 to the colRanges and rowRanges. The comparison may be done by taking, in one dimension, the largest minimum value (minIntersection) of the two ranges and the smallest maximum value (maxIntersection) of the two ranges. If maxIntersection is less than minIntersection, there is no intersection. Otherwise, if minIntersection is less than maxIntersection, the intersection spans between minIntersection and maxIntersection. This algorithm may be repeated for each additional dimension of each content element. Those of ordinary skill in the art will recognize that there are also other ways of determining the intersections.

In step 6(c), the relative positioning processor 122 inserts the content elements 201, 202, 203, and 204 into the matrix 600 based on the xRange and yRange values and the intersections. In one exemplary embodiment, the relative positioning processor 122 may also, in step 6(d), provide indications of extensions of the dimensions of a content element by inserting rowSpans and colSpans values. In another exemplary embodiment, if there are any additional intersections, the relative positioning processor 122 adds an indication to ignore or skip that row and column (e.g., an HTML skip element or "ignore-me" element), and optionally adds an indication to extend the dimension of the skip element.

Figure 7:
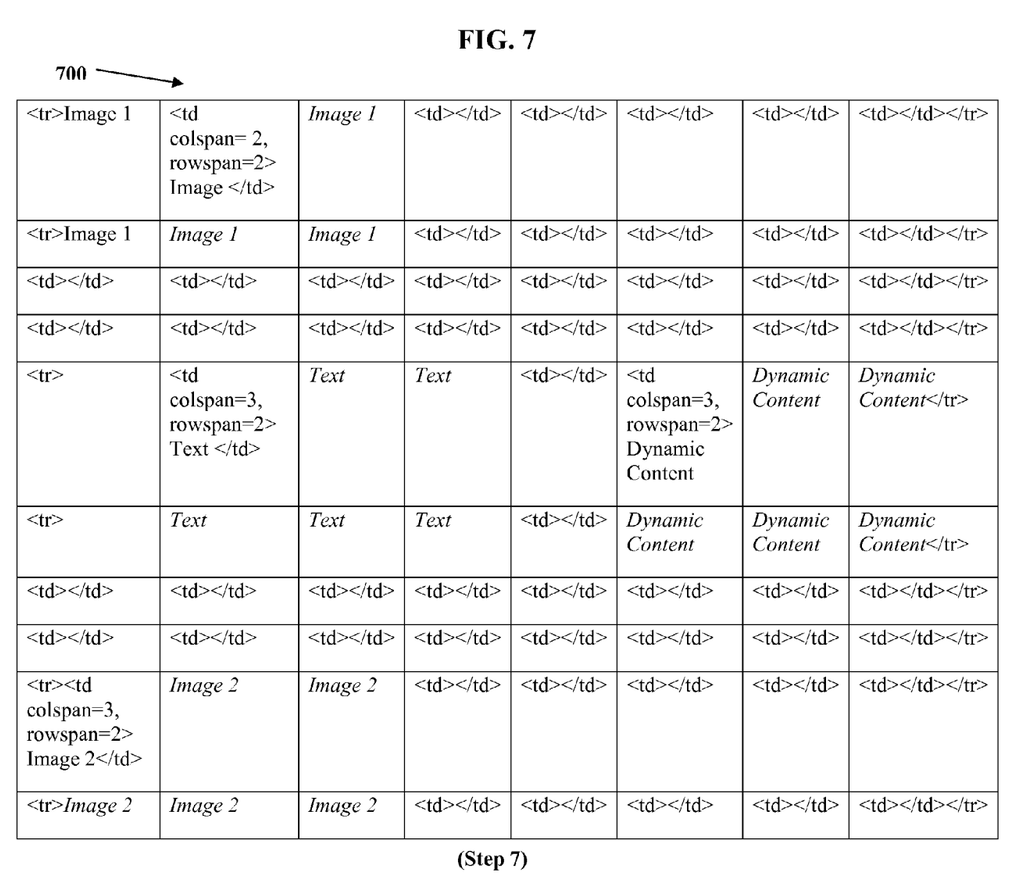
FIG. 7 illustrates an exemplary HTML table structure in connection with an exemplary operation of the pseudo-code illustrated in FIG. 4 and the canvas illustrated in FIG. 2.

In step 7, the relative positioning processor 122 creates an HTML table structure, such as the table structure 700 depicted in FIG. 7. In step 7(a), for each row, the relative positioning processor 122 inserts open and close '<tr>' tags. In step 7(b), for each element: (i) if the element is empty, the relative positioning processor 122 inserts a '<td>' tag where the width and height properties correspond to the size of the colRange and rowRange value; (ii) if the element is not empty (i.e., there is an element), the relative positioning processor 122 inserts a '<td>' tag where the colSpan and rowSpan values are set accordingly and the content for the element is inserted into the '<td>' tag. FIG. 7 illustrates the HTML table structure 700 that uses relative positioning of the various content elements. The empty "<td>" tag may include a "height" and a "width" span/space to move the content elements into their intended positions, although these values are not show in FIG. 7.

The resulting relative positioned resource may then be saved in a file format readable by rendering engines, for example those offered with e-mail clients such as Microsoft Outlook® and Thunderbird™. As such, the relative positioned resource may be displayed on a computer display.

In one embodiment, the absolute positioning processor 121 is a web-browser (e.g., Internet Explorer, FireFox, Opera, etc.) executing on a computer. The absolute positioning processor 121 may operate upon the intermediate data structure 300 to generate a resource having absolutely positioned content elements 201, 202, 203, and 204, which may then be displayed on a computer display. The absolute positioning processor 121 may, for example, operate according to the W3C ("world-wide-web consortium") standard for absolute positioning. In one embodiment, to convert the intermediate data structure 300 into an absolute positioned HTML document, the absolute positioning processor 121 converts the layout hash (i.e., the coordinates, width range, and height range indicated in the intermediate data structure 300) for each content element 201, 202, 203, and 204 into 'style' and 'div' tags. For example, for Image 1 (i.e., content element 201 depicted in FIG. 2), the layout hash may be converted as follows: '<div style='top: 0 px; left: 0 px; width 300 px; height: 200 px'> . . . </div>'.

Accordingly, in addition to other advantages, embodiments of the present invention allow a relative positioned resource and an absolute positioned resource to be generated using a single editor having a single syntax for both the relative and absolute positioned elements. Thus, rendering may be kept completely consistent (e.g., "pixel perfect") between two different mediums, ensuring a completely consistent user experience between the two different mediums.

It should also be noted that embodiments of the present invention may be provided as one or more computer-readable programs embodied on or in one or more articles of manufacture. The article of manufacture may be a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. In particular, it should be understood that the order of steps or order for performing certain actions is immaterial so long as the invention remains operable. Two or more steps or actions may also be conducted simultaneously. As such, the invention is not to be defined only by the preceding illustrative description.

What is claimed is:

1. A method for creating resources having absolute and relative positioned elements using a single unified model, the method comprising:
   providing a layout editor, the layout editor having a syntax that corresponds to at least absolute positioned elements and relative positioned elements;
   receiving an element information, wherein the element information corresponds to a layout of one or more content elements;
   generating, and storing in computer memory, an intermediate data structure based at least in at on the received element information, the element information including content of at least one element, Cartesian coordinates of the at least one element, and dimensional information of the at least one element;
   exporting, based at least in part on a selection received from a user, the intermediate data structure to a unified processing module to create at least one resource;
   generating, through the unified processing module, a first resource having absolute positioned elements by processing the intermediate data structure; and
   generating, through the unified processing module, a second resource having relative positioned elements by processing the intermediate data structure.

2. The method according to claim 1, further comprising causing at least one of the first resource or the second resource to be displayed on a computer display.

3. The method according to claim 1, wherein the intermediate data structure comprises an array having fields for the content of the at least one element, a starting coordinate of the at least one element, a width of the at least one element, and a height of the at least one element.

4. The method according to claim 1, wherein generating the second resource comprises creating a table structure based on the element information.

5. The method according to claim 1, wherein the method is performed within a web browser.

6. The method according to claim 1, wherein the content comprises at least one of text, an image, audio, a video, a form, a field merge, or dynamic content.

7. The method according to claim 1, wherein the first resource and the second resource are in a different format renderable by a browser's layout engine.

8. The method according to claim 1, wherein the first resource comprises a web page.

9. The method according to claim 1, wherein the second resource comprises an e-mail.

10. The method according to claim 1, further comprising presenting a canvas to a user.

11. The method according to claim 10, further comprising receiving position information for an element positioned on the canvas.

12. The method according to claim 10, wherein the canvas facilitates what-you-see-is-what-you-get layout editing.

13. A computing system for creating resources having absolute and relative positioned elements, the computing system comprising:
   a computer memory;
   a layout module having a syntax that corresponds to at least absolute positioned elements and relative positioned elements, wherein the layout module generates, and stores in the computer memory, an intermediate data structure based on element information, the element information including content of at least one element, Cartesian coordinates of the at least one element, and dimensional information of the at least one element, and wherein the layout module exports, based at least in part on a selection from a user, the intermediate data structure to a unified processing module to create at least one resource; and
   the unified processing module that generates a first resource having absolute positioned elements by processing the intermediate data structure, and that generates a second resource having relative positioned elements by processing the intermediate data structure.

14. The computing system according to claim 13, wherein the unified processing module comprises an absolute positioning processor and a relative positioning processor.

15. The computing system according to claim 13, wherein the unified processing module is further configured to cause at least one of the first resource or the second resource to be displayed on a computer display.

16. The computing system according to claim 13, wherein the intermediate data structure comprises an array having fields for the content of the at least one element, a starting coordinate of the at least one element, a width of the at least one element, and a height of the at least one element.

17. The computing system according to claim 13, wherein the unified processing module creates a table structure based on the element information in generating the second resource.

18. The computing system according to claim 13, wherein at least one of the layout module and the unified processing module operates within a web browser.

19. The computing system according to claim 13, wherein the content comprises at least one of text, an image, audio, a video, a form, a field merge, or dynamic content.

20. The computing system according to claim 13, wherein the first resource and the second resource are in a different format renderable by a browser's layout engine.

21. The computing system according to claim 13, wherein the first resource comprises a web page.

22. The computing system according to claim 13, wherein the second resource comprises an e-mail.

23. The computing system according to claim 13, wherein the layout module is further configured to present a canvas to a user.

24. The computing system according to claim 23, wherein the canvas facilitates what-you-see-is-what-you-get layout editing.

* * * * *